United States Patent [19]

Mellum et al.

[11] Patent Number: 4,672,623

[45] Date of Patent: Jun. 9, 1987

[54] CATHODE CONSTRUCTION FOR A LASER

[75] Inventors: Lowell C. Mellum, Fridley; Theodore J. Podgorski, Maplewood, both of Minn.

[73] Assignee: Honeywell Inc., Minneapolis, Minn.

[21] Appl. No.: 766,736

[22] Filed: Aug. 16, 1985

[51] Int. Cl.⁴ .................... H01S 3/097; G01C 19/64
[52] U.S. Cl. ...................................... 372/87; 356/350
[58] Field of Search .................... 372/87, 88; 356/350

[56] References Cited

U.S. PATENT DOCUMENTS 4,575,855  3/1986  Council .............................. 356/350

Primary Examiner—Gene Wan
Attorney, Agent, or Firm—Robert A. Pajak

[57] ABSTRACT

Disclosed is a cathode for a ring laser comprising a housing composed of substantially a nickel-iron composition having an inner cavity with a coating of a low sputtering electrically conductive material thereon.

3 Claims, 2 Drawing Figures

CATHODE CONSTRUCTION FOR A LASER

BACKGROUND OF THE INVENTION

The present invention relates generally to gas discharge devices, especially those utilized in ring laser angular rate sensors, and more particularly, to the cathode construction found in such assemblies.

Ring laser angular rate sensors are well known and are particularly described in U.S. Pat. No. 3,373,650, issued to Killpatrick, and U.S. Pat. No. 3,390,606, issued to Podgorski, both of which are assigned to the assignee of the present invention. The above referred to patents are incorporated herein by reference thereto.

Ring laser angular rate sensors of the type referred to utilize a substantially thermally and mechanically stable block having a plurality of interconnected gas containing tunnels in the shape of a triangle, a rectangle, or the like. At each intersection of a pair of interconnected tunnels is a mirror mounted on the block. This arrangement of mirrors and interconnected tunnels forms an optical closed-loop path. Further, at least one anode and one cathode are each mounted on the block and in communication with the gas. Each of the components, including the mirrors, anode, and cathode, are sealed to the block to form a gas tight seal by any one of a variety of techniques. The block is usually filled with a lasing gas such as a mixture of helium and neon. A sufficiently large electrical potential is applied between the anode and cathode to cause a discharge current therebetween which results in the production of a pair of counter-propagating laser beams within the block.

Ring laser angular rate sensors of the type just described require long life characteristics. The life of a ring laser angular rate sensor is dramatically affected by (i) the seal between components mounted on the block, and (ii) the cathode life. The present invention is directed to a cathode construction which will enhance laser life.

One example of a prior art cathode consists of a housing composed of aluminum coated with a thin layer of oxide. During the manufacturing process the layer of aluminum oxide is formed naturally by exposing the aluminum cathode to an oxygen plasma with the aluminum cathode connected as the cathode in a gas discharge device circuit. The thin layer of oxide is formed due to the pressure of oxygen and the heating effect of the plasma. Another cathode construction consists of a hollow cylinder made of aluminum having a layer of oxide formed thereon by means of anodization as shown and described in U.S. Pat. No. 4,007,431, issued to Abbink, et al.

It should be understood that it is important that the cathode be mounted on the block in such a way as to form a gas tight seal. Commonly, with laser blocks made of quartz, Cervit, Zerodur, and the like, the aluminum cathode is sealed to form a gas tight seal to the block by use of an indium (solder) seal well understood in the art. A problem with cathode construction and mounting techniques of the prior art is that differences between the thermal expansion coefficients of aluminum and the laser block can cause a breakdown of the gas tight seal resulting in laser failure. This is so since the block usually has an ultra low thermal expansion coefficient as compared to the aluminum.

To constrain the thermal expansion and movement of the cathode relative to the block and thereby reduce the potential for breaking the gas tight seal, an Invar constraining ring may be placed around the aluminum cathode and inertia welded or epoxied thereto. Although the Invar ring constrains the thermal expansion of the aluminum relative to the block, there still remains some thermally caused movement which adversely affects laser life.

BRIEF DESCRIPTION OF THE INVENTION

It is an object of the present invention to provide a cathode construction which provides good matching of thermal expansion coefficients between the cathode and the block. In the present invention, a cathode is constructed of a nickel-iron composition referred to as Invar. The Invar cathode includes a cavity defining an interior surface extending from an opening which forms in part an outer mounting surface. The Invar cavity surface is coated with a low sputtering, electrically conductive material such as aluminum, beryllium or the like.

DETAILED DESCRIPTION OF THE INVENTION

Figure 1:
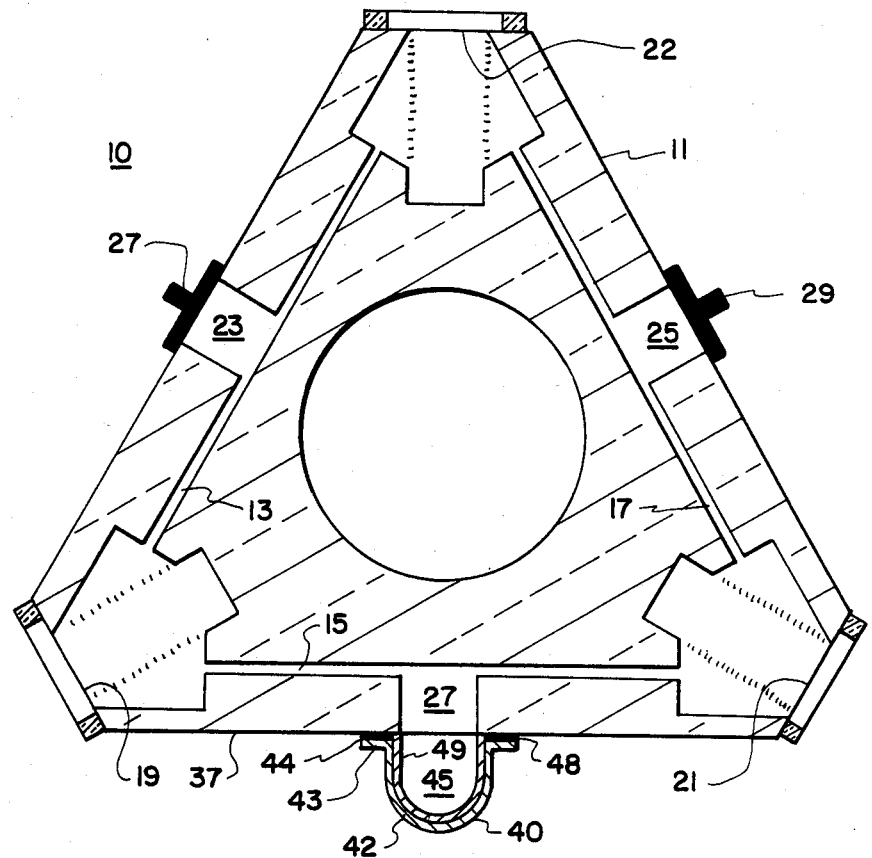
FIG. 1 is a cross-sectional view of a ring laser angular rate sensor with a cathode of the present invention.

Referring now to FIG. 1, there is disclosed a pictorial representation of a gas filled ring laser angular rate sensor 10 comprising a block 11 usually made of quartz, Cervit, Zerodur, ceramic, or the like. A plurality of three interconnected tunnels 13, 15, and 17 are bored within block 11 at angles to each other to form a triangular shaped cavity. Mirrors 19, 21, and 22 are mounted on block 11 at the intersection of each of the tunnels 13, 15, and 17, respectively. Each mirror functions to reflect light from one tunnel into the next thereby forming a closed-loop optical path.

A pair of anodes 27 and 29 are mounted on block 11 and adapted to communicate with laser tunnels 13 and 17 respectively, through interconnecting cavities 23 and 25, respectively. A quantity of lasing gas for plasma is adapted to be contained within the tunnels 13, 15, and 17. The gas may be inserted into the block cavities through one of the anode cavities used as a fill tube and one of the anodes which may also serve as a sealable port.

A cathode 40 is mounted on block 11 and in communication with the optical closed-loop cavity through interconnecting cavity 27. Cathode 40 is symmetrically located relative to anodes 27 and 29, and tunnels 13, 15, and 17. The symmetrical location of the pair of anodes and cathode is intended to reduce gas flow effects which can adversely affect the performance of the rate sensor as is well known.

In operation, with a sufficiently large potential applied between the cathode and the anodes, a first discharge current is emitted from cathode 40 out into tube 15 toward mirror 19 and through tube 13 to anode 27. A second discharge current flows from cathode 40 out into tube 15 toward mirror 21 and through tube 17 to anode 29. These two discharge currents are usually controlled in intensity. The discharge currents function to ionize the lasing gas and thereby provide a pair of counter-propagating laser beams within the closed-loop optical cavity in a well known manner.

As indicated earlier, block 11 is typically made of an ultra-low expansion material such as Cervit which is made by Owens, an Illinois corporation.

Figure 2:
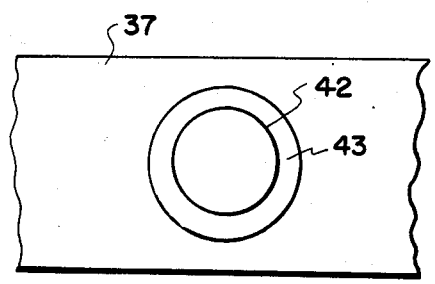
FIG. 2 is a side view of the cathode and block.

Cathode 40, as shown in FIGS. 1 and 2, comprises a dome shaped outer housing 42 composed of Invar which is substantially a composition of 36% nickel and 64% iron. Housing 42 includes an annular flange 43 for providing a mounting surface 44. Cathode 40 includes a cavity 45 inwardly extending from mounting surface 44.

Again referring to FIG. 1, the outer flange surface 44 is mounted on block 11 by use of an indium solder seal 48. The indium seal provides a gas tight seal between cathode 40 and block 11.

Cathode 40 composed of Invar is also an ultra-low expansion material which suitably matches the ultra-low expansion material of block 11 composed of quartz and the like. The inner surface of the housing which defines the cathode cavity is also coated with a low sputtering electrically conductive material 49. The cavity surface 49 serves as an electron emitting surface which forms in part the gas discharge device. The electrically conductive material is intended to be a low sputtering variety to avoid sputtering of the cathode material by positive ions in the gas discharge device. Two electrically conductive materials which satisfy the low sputtering requirement include aluminum oxide and beryllium oxide.

The foregoing description of the embodiment of the invention provides a highly matched cathode-block construction. Practice of the invention will yield long life laser operation where the laser block is made of a material having an ultra-low thermal expansion coefficient.

By way of another example, a ring laser block may also be provided by glasses such as a BK-7 glass. In this situation, Invar (36% nickel-64% iron) does not have thermal expansion characteristics which match BK-7 glass. However, a cathode composed of Kovar having substantially a composition of 29% nickel and 53% iron composition with 17% cobalt provides a cathode having a thermal coefficient which suitably matches a BK-7 type block.

While only certain particular embodiments have been described in detail herein, it will be apparent to those familiar with the art that certain modifications can be made without departing from the spirit and scope of the invention as defined by the following claims. Specifically, a triangular ring laser has been shown having particular details. Nevertheless, the present invention is applicable to any gas discharge device or laser configuration both separately and as part of a ring laser angular rate sensor.

The embodiments of the invention in which an exclusive property or right is claimed are defined as follows:

1. A cathode for a gas discharge device comprising:
   a housing composed substantially of a nickle-iron composition, said housing including an outer mounting surface and an inner surface forming a cavity extending from said outer mounting surface;
   a low sputtering, electrically conductive material coating on said interior surface.

2. The cathode of claim 1 wherein said conductive material is selected from the group of aluminum and beryllium.

3. A ring laser angular rate sensor comprising:
   a substantially thermally and mechanically stable block having a plurality of interconnected gas containing tunnels forming an optical closed-loop path cavity therein;
   at least one anode mounted on said block and in communication with said gas;
   a cathode mounted on said block and in communication with said gas, said cathode having a housing composed substantially of a nickel-iron composition, said housing including an outer mounting surface and an inner surface forming a cavity extending from said outer mounting surface, said cavity interior surface having a low sputtering electrically conductive material coating thereon.

* * * * *